Patented Oct. 30, 1934

1,979,154

UNITED STATES PATENT OFFICE 1,979,154

PRODUCTION OF N-BENZYL-PARA-AMINOPHENOL

Chester W. Hannum, Chicago, Ill., assignor to E. I. du Pont de Nemours & Company, Wilmington, Del., a corporation of Delaware No Drawing. Application May 17, 1933, Serial No. 671,593

6 Claims. (Cl. 260—128)

This invention relates to N-benzyl-para-aminophenol, and a process for the purification thereof.

In the production of N-benzyl-para-aminophenol, the final product is often contaminated with impurities, such as para-aminophenol. The presence of para-aminophenol is objectionable since it readily discolors on exposure to air, causing a considerable darkening of the product. In attempting to remove para-aminophenol from N-benzyl-para-aminophenol by crystallization from organic solvents, such as toluene, it has been found that, although the solubilities of the two compounds as such are markedly different, unexpected difficulties have been encountered when both compounds are present at the same time. The difficulty in removing para-aminophenol from N-benzyl-para-aminophenol by crystallization from organic solvents, such as toluene, apparently lies in the fact that para-aminophenol is soluble in concentrated solutions of N-benzyl-para-aminophenol. Thus, para-aminophenol is practically insoluble in toluene, either hot or cold, while N-benzyl-para-aminophenol is very soluble in hot toluene and only slightly soluble in the cold toluene. However, in the presence of a large amount of N-benzyl-para-aminophenol, the para-aminophenol apparently dissolves in hot toluene. As the solvent cools, N-benzyl-para-aminophenol crystallizes out, thus making the para-aminophenol less soluble and it also crystallizes. For this reason, very little separation of the two compounds can be accomplished by this method.

It has previously been proposed to separate N-benzyl-para-aminophenol from a reduction mixture containing the same by neutralizing the reduction mixture with hydrochloric acid and removing the slightly soluble N-benzyl-para-aminophenol by filtration. As an alternative, the isolation of the product as its hydrochloride by the use of excess hydrochloric acid has been suggested. In either of these processes, where para-aminophenol is present in the reduction mixture, an appreciable amount of para-aminophenol remains in the product, causing discoloration.

It is an object of this invention to provide a new and improved process for the purification of N-benzyl-para-aminophenol. A further object is to provide an improvement in the process for the manufacture of N-benzyl-para-aminophenol whereby a product practically free from para-aminophenol may be obtained. A still further object is to produce N-benzyl-para-aminophenol which is practically free from the tendency to discolor in air. Other objects will appear hereinafter.

These objects are accomplished by this invention by treating solutions or suspensions containing N-benzyl-para-aminophenol and para-aminophenol with an excess of sulfuric acid, whereby the sulfate of the former compound is precipitated and the more soluble para-aminophenol sulfate may be removed by filtration.

While the invention is susceptible to considerable variation and modification in the manner of its practical application, particularly as regards the proportions of materials and the exact method of procedure, the following examples, in which the parts are by weight, will serve to illustrate how the invention may be practised.

Example I

Sixty parts of N-benzal-para-aminophenol were dissolved in an excess of 30% sodium hydroxide solution, and 30 parts of zinc dust were added. After stirring about eight hours, the mixture was treated with 800 parts of 25% sulfuric acid. A grey mass comprising crystalline N-benzyl-para-aminophenol sulfate, together with unreacted metallic zinc, was filtered off and washed with water. The solid was suspended in boiling water and treated with excess sodium carbonate solution and then with hydrochloric acid until the liquid was neutral to litmus paper. The residue, consisting of N-benzyl-para-aminophenol and metallic zinc, was filtered off and dried. The product was crystallized from a mixture of benzene and petroleum ether, yielding white crystals.

When the foregoing process was repeated, except that the completed reduction mass was treated with hydrochloric acid instead of sulfuric acid, the N-benzyl-para-aminophenol was light brown in color and became darker on exposure to air. The product from the first process, on the contrary, showed no tendency to discolor with age.

Example II

One hundred parts of N-benzal-para-aminophenol and 58 parts of zinc dust were suspended in 400 parts of water and the mixture cooled to 0° C. to 5° C. The liquid was agitated vigorously, and 210 parts of 30% sodium hydroxide were added dropwise during about one and one-half hours. After about four hours, the color of the reaction mass changed from a yellowish green to grey. The mixture was stirred for another hour and poured into a solution of 240 parts of sulfuric acid in 800 parts of water. The resulting solid material was filtered off, washed with water and was then suspended in boiling water. The mixture was then exactly neutralized with sodium carbonate solution and cooled. The crude product was filtered off, dried and crystallized from toluene. The product, consisting of glistening white crystals, did not change in appearance even after storage for several months.

The amount of sulfuric acid required in this process may vary but is preferably at least one equivalent for each mole of N-benzyl-para-aminophenol present, that is, one-half mole of sulfuric acid for each mole of N-benzyl-para-aminophenol. An excess of sulfuric acid is beneficial in a slight degree, but very little advantage is gained thereby. No definite limit can be set as to the maximum amount of sulfuric acid which may be used.

Instead of employing sulfuric acid as such, it may be formed in situ, for example, by the use of a salt of sulfuric acid such as sodium sulfate in conjunction with a strong mineral acid such as hydrochloric acid.

One of the advantages of the invention lies in the ease with which the separation of N-benzyl-para-aminophenol from one of its principal impurities, namely, para-aminophenol, can be effected. The products obtained are less colored and less liable to discoloration in storage than those obtained by the practice of the prior art. It could not be foreseen that the separation of N-benzyl-para-aminophenol, in the form of its sulfate, would be more efficient than the separation as its hydrochloride. This is more surprising in view of the fact that the literature discloses that both N-benzyl-para-aminophenol sulfate and para-aminophenol sulphate are sparingly soluble in water.

As many apparently widely different embodiments of this invention may be made without departing from the spirit and scope thereof, it is to be understood that I do not limit myself to the specific embodiments thereof, except as defined in the following claims.

I claim:

1. The process which comprises treating N-benzyl-para-aminophenol containing para-aminophenol with sulfuric acid, and separating the N-benzyl-para-aminophenol sulfate.

2. The process of claim 1, in which the sulfuric acid is formed in situ.

3. The process which comprises treating N-benzyl-para-aminophenol containing para-aminophenol with sulfuric acid in the presence of sufficient water to dissolve the formed para-aminophenol sulfate, and separating the formed insoluble N-benzyl-para-aminophenol sulfate.

4. In a process of producing N-benzyl-para-aminophenol by the reduction of N-benzal-para-aminophenol with zinc and sodium hydroxide in the presence of water, the steps which comprise treating the completed reduction mixture with sulfuric acid, and separating the N-benzyl-para-aminophenol as N-benzyl-para-aminophenol sulfate.

5. In a process of producing N-benzyl-para-aminophenol by reducing N-benzal-para-aminophenol in the presence of zinc dust, water and sodium hydroxide at a temperature of about 0° C. to about 5° C., the steps which comprise pouring the resultant reaction mixture into a 25% sulfuric acid solution, separating the solid material containing chiefly N-benzyl-para-aminophenol sulfate and metallic zinc, boiling said solid material with an aqueous solution of a mild alkali in excess of that required for conversion of the N-benzyl-para-aminophenol sulfate to N-benzyl-para-amino-phenol, neutralizing, separating the solid residue, and recovering the N-benzyl-para-aminophenol by crystallization from an organic solvent.

6. In a process of producing N-benzyl-para-aminophenol by suspending about 100 parts of N-benzal-para-aminophenol and about 58 parts of zinc dust in about 400 parts of water, cooling to about 0° C. to about 5° C., agitating the mixture vigorously with gradual addition of 210 parts of 30% sodium hydroxide until after a color change from yellowish green to grey occurs, the steps which comprise pouring the resultant reaction mixture into a solution of about 240 parts of $H_2SO_4$ in about 800 parts of water, separating the solid material containing chiefly N-benzyl-para-aminophenol sulfate and metallic zinc, boiling said solid material with an aqueous solution of sodium carbonate in excess of that required for conversion of the N-benzyl-para-aminophenol sulfate to N-benzyl-para-aminophenol, neutralizing, separating the solid residue, and recovering the N-benzyl-para-aminophenol by crystallization from an organic solvent.

CHESTER W. HANNUM.